United States Patent [19]

Owlett

[11] Patent Number: 4,512,504
[45] Date of Patent: Apr. 23, 1985

[54] SHOPPING ORGANIZER

[76] Inventor: Lois Owlett, 734 Maple Ridge Rd., Milford, Ohio 45150

[21] Appl. No.: 563,069

[22] Filed: Dec. 19, 1983

[51] Int. Cl.³ ............................................. B60R 11/00
[52] U.S. Cl. ............................ 224/42.46 R; 150/106; 224/277
[58] Field of Search ............... 224/42.46 R, 273, 274, 224/277; 150/35

[56] References Cited

U.S. PATENT DOCUMENTS

| | | | |
|---|---|---|---|
| 1,264,547 | 4/1918 | Nickel | 150/35 X |
| 3,949,917 | 4/1976 | Mann | 224/277 X |
| 4,274,567 | 6/1981 | Sawyer | 224/42.46 R X |
| 4,296,945 | 10/1981 | Pavlik | 150/35 |
| 4,391,370 | 7/1983 | Dalbo | 150/35 X |

*Primary Examiner*—Steven M. Pollard
*Attorney, Agent, or Firm*—Wood, Herron & Evans

[57] ABSTRACT

A shopping organizer comprising a one-piece backing sheet foldable into upper, middle and bottom sections with a flap adapted to wrap around and releasably secure the organizer to the handle of a market basket. A sleeve for receiving a pen, a plate having a spring clip for retaining papers and a pair of pockets of different size, at least one of which is divided into compartments, are mounted to one or more sections of the backing sheet to provide a shopping organizer for the convenient storage of coupons, shopping lists, a calculator and other items useful for shopping.

8 Claims, 4 Drawing Figures

U.S. Patent  Apr. 23, 1985  4,512,504
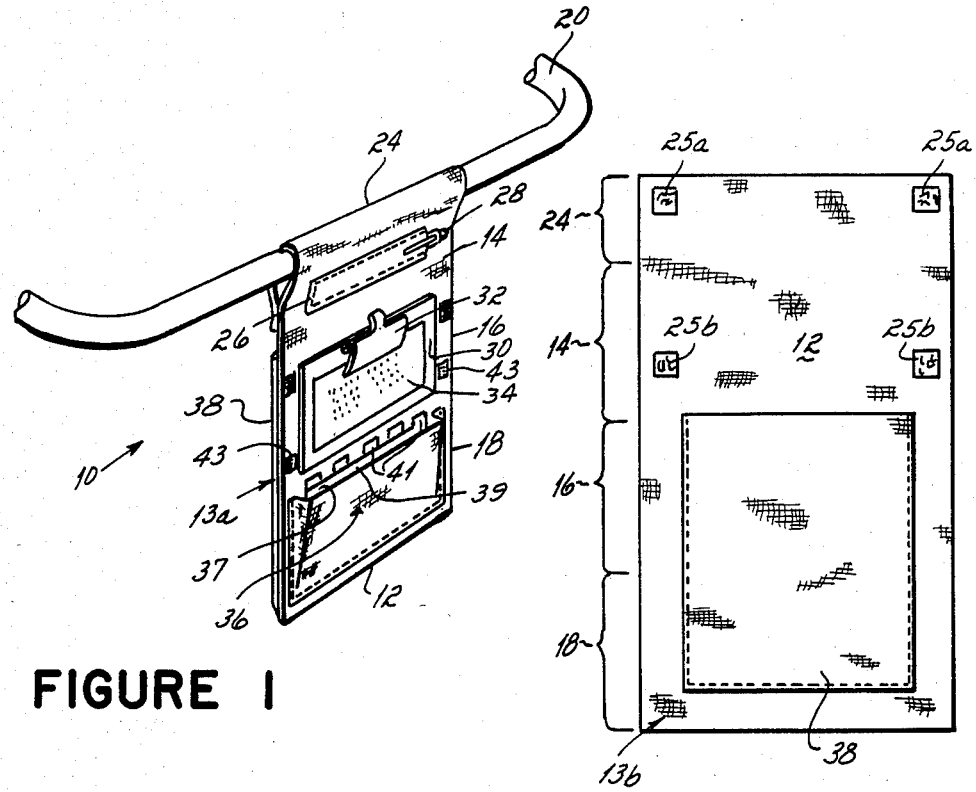
FIGURE 1
FIGURE 2
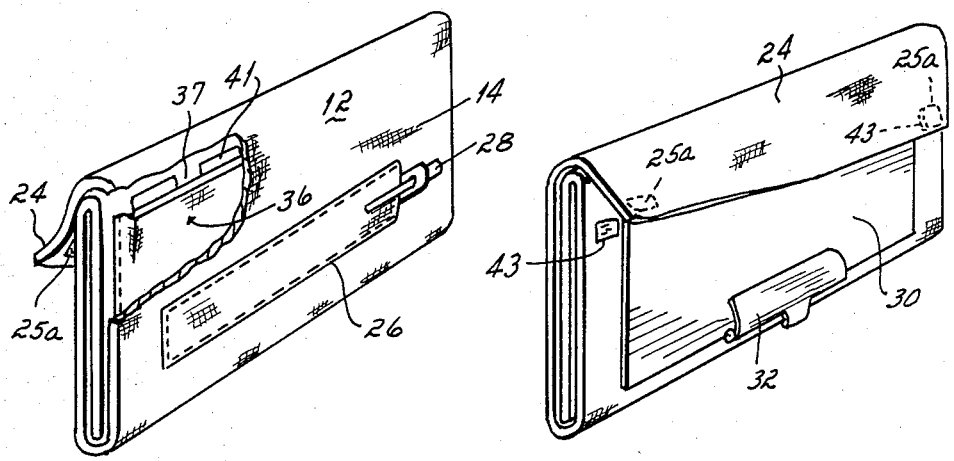
FIGURE 3a
FIGURE 3b

SHOPPING ORGANIZER

BACKGROUND OF THE INVENTION

This invention relates to a shopping organizer, and, more particularly, to a one-piece, foldable organizer for storing coupons, shopping lists and the like.

It is common practice in retail sales establishments, particularly supermarkets and drug stores, to promote various items by the issuance of premiums or coupons which are redeemable by the customer at the store. Coupons reach the customers from a variety of sources including newspapers, magazines and direct mail advertisements from which they are clipped as the customer compiles a shopping list. In most cases, the coupons are redeemable only at the point of purchase for a specific item, and must be presented to the cashier at the time of purchase. Due to the variety and sheer number of coupons that many shoppers customarily handle in even a single shopping trip, proper organization of coupons is important. A need exists for an organizer having a pocket or other storage compartment in which coupons can be orderly arranged while making up one's shopping list so that the appropriate coupons are readily available at the checkout line. It is also advantageous for the coupon organizer to be conveniently mounted to the shopping cart, and include a hard writing surface preferably having some means to clip a shopping list thereto, so that as items are placed in the cart they can be marked off the list.

A variety of shopping organizers have been proposed in the prior art including those having a clipboard mounted to the shopping cart for retaining a shopping list. See for example, U.S. Pat. Nos. 3,881,267; 2,888,761; and 3,539,204. These patents disclose an assortment of clamps, clips and other means for mounting the clipboard in a generally horizontal position to the shopping cart adding to the cost of such organizers. Moreover, such clamp and clip designs may not be adapted to mount to shopping carts having different spacings between the handles and baskets and/or different diameter handles and wires forming the baskets. In addition, none of the shopping organizers disclosed in the above-listed patents include a pocket or other means for carrying and organizing coupons.

Other known shopping organizers provide both a pocket for organizing coupons and a clipboard for securing a shopping list. For example, U.S. Pat. No. 4,274,567 to Sawyer describes an organizer comprising a rigid plate or board including a spring clip, which is hinged to an accordion-shaped receptacle having compartments for coupons and other materials. The rigid plate is formed with a mounting clip or strap for mounting the plate to the handle of a shopping cart, and the accordion-shaped receptacle is formed with hooks to mount it to a wire cross piece of the cart. While this organizer provides an improvement over those having only a clipboard, it too is relatively expensive to manufacture and may not be universally mounted to all types of shopping carts.

The Sawyer organizer and those described hereinabove each include a large rigid clipboard which is bulky and cannot be folded into a compact size. As is well known, many shopping carts include a child's seat at the rearward end of the basket part of the cart near the handle. If not used to seat a child, these seats are often used to carry easily crushed items such as bread and the like. Each of the patents cited above provide organizers which project over the handle and into the basket portion of the shopping cart, obstructing the child's seat and limiting its storage capability or placing it within easy reach of the child placed in the seat.

SUMMARY OF THE INVENTION

It is among the primary objects of this invention to provide an inexpensive, one-piece, foldable shopping organizer which can be mounted to any type of market basket without interferring with the child's seat, and which provides for organization of coupons and mounting of a shopping list.

The shopping organizer comprises a backing sheet of flexible material such as cloth, felt, denim, thin plastic and similar materials having a back and a front side, which is foldable in thirds and when unfolded forms an upper section, a middle section and a lower section. The upper section is formed with the flap which is adapted to wrap around the handle of the market basket, and fastening means such as snaps or Velcro (®) fastening material are provided to secure the flap about the handle. In the carrying position of the organizer, the three sections are folded together so that the overall dimensions of the organizer are substantially equal to one of the sections. In use, the organizer is unfolded and attached to the market basket handle by the flap from which it hangs vertically downwardly so as not to obstruct the basket part of the cart where articles are placed.

A narrow sleeve is sewn, glued or otherwise attached to the upper section and is adapted to receive a pen or pencil. A rigid plate formed of plastic, wood, metal or a similar material is mounted to the middle section of the backing sheet and is provided with a spring clip for grasping paper sheets. It is contemplated that the shopping list will be clipped to the plate so that items can be marked off the list when placed in the cart. The plate provides a rigid surface for writing on the shopping list as desired. The lower section of the backing sheet is provided with a pocket for receiving coupons or other materials. The pocket may be divided into several compartments for better organization of the coupons, and opens toward the upper section so that the coupons are retained in the pocket when the organizer is in use. Preferably, the sleeve, plate and pocket are mounted to the front side of the backing sheet.

Mounted to the back or reverse side of the backing sheet is a larger pocket which preferably is equal in width to at least the lower and middle sections. The larger pocket is intended to provide storage for a calculator, additional coupons or any other items normally used for shopping.

DESCRIPTION OF THE DRAWINGS

The structure, operation and advantages of this invention will become further apparent upon consideration of the following description taken in conjunction with the accompanying drawings, wherein:

FIG. 1 is a front view of the organizer of this invention attached to a typical market basket;

FIG. 2 is a back view of the organizer herein in an extended position;

FIG. 3a is a front view of the organizer in a folded position for carrying; and

FIG. 3b is a back view of the organizer in a folded position for carrying.

DETAILED DESCRIPTION OF THE INVENTION

The shopping organizer 10 of this invention comprises a backing sheet 12 having a front side 13a and a back side 13b which is generally rectangular in shape and is foldable lengthwise approximately in thirds to form a top section 14, a middle section 16 and a bottom section 18. Preferably, each section 14, 16, 18 is substantially equal in size so that when the backing sheet 12 is folded together, as in FIG. 3, its length and width dimensions are reduced to the size of one of the sections 14, 16, 18. It is contemplated that the backing sheet 12 may be formed of virtually any flexible, foldable material such as cloth, flexible plastic and the like. Decorative designs may be imprinted on the backing sheet 12, as desired, to enhance its appearance.

Referring now to FIGS. 1 and 2, the organizer 10 is shown in its unfolded position, mounted to the handle 20 of a shopping cart (not shown). A flap 24 is attached to the top section 14 of the backing sheet 12 and is adapted to be folded over the handle 20 and into contact with the back side 13b of the upper surface 14 of sheet 12. Fastening means are mounted at the edge of the flap 24 and at the point on the back side 13b of sheet 12 where the flap 24 makes contact when folded around the handle 20. It is contemplated that a variety of fastening means could be used to releasably secure the flap 24 about the handle 20 including clasps, snaps, or a fastening material having cooperating, interconnecting hooks and loops such as Velcro (®) fastening material. In the preferred embodiment of the invention shown in the Figures, a fastening material is used including hook sections 25a and loop sections 25b. A pair of hook sections 25a are mounted to opposite edges of the back side 13b of flap 24, and cooperating loop sections 5b are mounted to the back side 13b of upper section 14 on sheet 12 so that when the flap 24 is folded over the handle 20 the hook sections 25a interconnect with the loop sections 25b to releasably secure the organizer 10 to handle 20.

The manner of mounting organizer 10 to handle 20 disclosed herein provides several advantages over prior art organizers. Every shopping cart, regardless of the particular wire basket design, includes a handle. The organizer 10 may therefore be universally mounted to any shopping cart regardless of the basket design. In addition, the organizer 10 hangs vertically downwardly from the cart handle 20 and does not extend over the handle 20 toward the basket of the cart. Thus, the baby seat provided in most carts may be used by a child or can receive items such as bread and the like, which are easily crushed, without interference from the organizer 10. The flap 24 fits loosely around the handle 20 so that the organizer 10 may be lifted upwardly to provide access to the sections 14, 16, 18 as described below.

An elongate, narrow sleeve 26 is sewn, glued or similarly mounted to the top section 14 as shown in FIGS. 1 and 3. The sleeve 26 is adapted to hold a pen or pencil 28, and is mounted horizontally along the top section 14, parallel to handle 20 with the organizer 10 mounted thereto, to retain the pencil 28 within sleeve 26. A rigid plate 30 having a spring clip 32 is mounted to the middle section 16 of backing sheet 12. Plate 30 is formed of wood, plastic, thin metal or a similar material which provides a planar, rigid surface for writing. The spring clip 32 is adapted to releasably secure papers such as a shopping list 34 to the plate 30, so that the list 34 is readily visible and can be written on against the plate 30. Preferably, the plate 30 covers a substantial portion of the surface area of the middle section 16.

A pocket 36 is sewn, glued or similarly mounted to the bottom section 18 of sheet 12. In the preferred embodiment, pocket 36 is attached at three edges to the bottom section 18 and its upper end 37 opens upwardly toward the upper section 14 with the organizer 10 on handle 20. It is contemplated that fastening means such as a Velcro (®) fastening material can be attached at the upper end 37 of pocket 36, if desired, so that it may be releasably closed to retain coupons or other materials placed therein. In addition, the pocket 36 is divided into compartments 37 for the organization of coupons or other materials. The compartments 37 may be formed by inserting several rigid dividers 39 of heavy paper or cardboard into the pocket 36 each having tabs 41, or the pocket 36 may be accordion-shaped with separate, permanent dividers (not shown) which are movable between a closed position when the pocket 36 is closed and an expanded position with the pocket 36 opened. Preferably, the sleeve 26, plate 30 and pocket 36 are all mounted on the front side 13a of sheet 12.

Mounted to the reverse or back side 13b of sheet 12 is a second, larger pocket 38 which preferably extends from the lower margin of bottom section 18 into at least the middle section 16. This larger pocket 38 is intended to receive a pocket calculator, additional coupons or other materials useful on a shopping trip and may be divided into compartments, if desired, in the same manner as pocket 36. Pocket 38 is preferably mounted to the backing sheet 12 by sewing, gluing or other means.

An important advantage of the organizer 10 herein is that it may be folded in a compact, easily carried form when not in use. Referring to FIG. 3, the organizer 10 is shown in a folded position wherein its length is reduced by two-thirds, or to approximately the dimension of one of the sections 14, 16, 18. The organizer 10 is folded by first folding the bottom section 18 onto the back side 13b of the middle section 16, and then folding the bottom and middle sections 18, 16, respectively, onto the back side 13b of top section 14. When folded, the flap 24 is free and the loop sections 25b of the fastening means for mounting organizer 10 to handle 20, disposed on the back side 13b of upper section 14, are covered by the middle and lower sections 16, 18. In the folded position, the plate 30 mounted to the front side 13a of middle section 16, and the sleeve 26 mounted to the front side 13a of top section 14 face outwardly. This provides the user with easy access to the pen or pencil 28 within the sleeve 26 and to the shopping list 34 of other materials retaining by spring clip 32, even in the folded position of organizer 10.

The pocket 36 attached to bottom section 18 is disposed between the top and middle sections 14, 16, respectively, when organizer 10 is folded and opens outwardly. In order to close pocket 36 in the folded position of organizer 10 and maintain the sections 14, 16, 18 folded together, additional fastening means are provided. As mentioned above, a pair of hook sections 25a are mounted to opposite edges of the back side 13b of flap 24. A pair of cooperating loop sections 43 of a fastening material such as Velcro (®) fastening material are mounted at opposite edges on the front side 13a of the middle section 16 at the points where the flap 24 makes contact with the middle section 16 when folded over. The hook sections 25a on the flap 24 interconnect with the loop sections 43 on the middle section 16 to secure the flap 24 over the open end 37 of the pocket 36 and prevent coupons or other materials from escaping the pocket 36. The flap 24 is simply detached from the middle section 16 to unfold the organizer 10 in preparation for use.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the apended claims.

I claim:

1. A shopping organizer for mounting to the handle of a shopping cart, comprising:
    a sheet having front and back sides, said sheet being foldable into sections, said sections being unfolded for mounting said sheet to said handle;
    a sleeve mounted to one of said sections and being adapted to hold a pen or pencil;
    a plate mounted to another of said sections;
    at least one pocket mounted to another of said sections;
    a flap attaching to said sheet, said flap being foldable in one direction around said handle with said sections unfolded, said flap thereafter being secured to said sheet for mounting said sheet to said handle so that said sections extend vertically downwardly from said handle, said flap being foldable in the opposite direction about said sections with said sections folded together, said flap thereafter being secured to said sheet for maintaining said sections folded together.

2. A shopping organizer as in claim 1 in which said flap is foldable over said handle and into contact with said back side of said sheet, said flap being secured to said sheet by at least one fastening material hook section mounted to one of said flap and said back side of said sheet, and at least one fastening material loop section mounted to the other of said flap and said back side of said sheet, said fastening material hook and loop sections interconnecting when said flap contacts said back side of said sheet to secure said flap and in turn said organizer to said shopping cart handle.

3. A shopping organizer as in claim 1 in which said sections of said sheet are adapted to be folded together in a compact size approximately equal in length and width to one of said sections.

4. A shopping organizer as in claim 1 having a first pocket and a second pocket mounted to said sheet.

5. A shopping organizer as in claim 4 in which said sleeve, plate and first pocket are mounted to said front side of said sheet.

6. A shopping organizer as in claim 4 in which said second pocket is mounted to said back side of said sheet.

7. A shopping organizer as in claim 4 in which said second pocket is mounted to at least two of said sections.

8. A shopping organizer as in claim 1 in which said flap is foldable about said folded sections and into contact with said front side of said sheet, said flap being secured to said sheet by at least one fastening material hook section mounted to one of said flap and said front side of said sheet, and at least one fastening material loop section mounted to the other of said flap and said front side of said sheet, said fastening material hook and loop sections interconnecting when said flap contacts said front side of said sheet to secure said flap about said folded sections.

* * * * *